United States Patent
Brock

(10) Patent No.: US 8,141,819 B2
(45) Date of Patent: Mar. 27, 2012

(54) MODULAR AIRCRAFT WITH REMOVABLE SPAR

(75) Inventor: Keith M. Brock, Vail, AZ (US)

(73) Assignee: Raytheon Company, Waltham, MA (US)

( * ) Notice: Subject to any disclaimer, the term of this patent is extended or adjusted under 35 U.S.C. 154(b) by 1022 days.

(21) Appl. No.: 12/100,252

(22) Filed: Apr. 9, 2008

(65) Prior Publication Data

US 2008/0277524 A1    Nov. 13, 2008

Related U.S. Application Data

(60) Provisional application No. 60/910,752, filed on Apr. 9, 2007.

(51) Int. Cl.
*B64C 1/26* (2006.01)
*B64C 3/18* (2006.01)

(52) U.S. Cl. ........... 244/120; 244/123.8; 244/124

(58) Field of Classification Search ........... 244/118.2, 244/120, 124, 123.1, 123.8, 123.9, 36, 38, 244/39, 46, 131, 154, 190, 199.4, 900; 446/61, 446/66; D21/449
See application file for complete search history.

(56) References Cited

U.S. PATENT DOCUMENTS

| | | | | |
|---|---|---|---|---|
| 1,935,533 A | * | 11/1933 | Wilmot et al. | 446/58 |
| 3,018,985 A | * | 1/1962 | Voigt | 244/123.8 |
| 4,108,403 A | * | 8/1978 | Finch | 244/199.2 |
| 4,535,958 A | * | 8/1985 | Hutchison | 244/123.8 |
| 5,052,641 A | | 10/1991 | Coleman | |
| 5,941,478 A | | 8/1999 | Schmittle | |
| 6,179,248 B1 | * | 1/2001 | Putman et al. | 244/36 |
| 7,175,168 B2 | * | 2/2007 | Hardaker et al. | 244/131 |
| 2006/0091258 A1 | | 5/2006 | Chiu et al. | |

* cited by examiner

*Primary Examiner* — Tien Dinh
*Assistant Examiner* — Richard R Green
(74) *Attorney, Agent, or Firm* — Renner, Otto, Boisselle & Sklar, LLP

(57) ABSTRACT

Methods and apparatus for aircraft according to various aspects of the present invention operate in conjunction with a fuselage and a wing. The fuselage may be configured to generate lift in response to airflow over the fuselage. In addition, the fuselage may have at least one hole defined therethrough. A spar may be disposed through the hole and extend into at least a portion of the wing and at least a portion of the fuselage. The spar may connect the fuselage to the wings.

1 Claim, 6 Drawing Sheets

MODULAR AIRCRAFT WITH REMOVABLE SPAR

CROSS-REFERENCES TO RELATED APPLICATIONS

This application claims the benefit of U.S. Provisional Patent Application No. 60/910,752, filed Apr. 9, 2007, and incorporates the disclosure of that application by reference.

BACKGROUND OF INVENTION

Aircraft frequently encounter stresses during operation. For example, airflow may tend to twist or bend the wings even under standard conditions. To overcome the potential dangers of operational stresses, most aircraft designs include systems for maintaining structural integrity.

Two alternatives in aircraft design are monocoque designs, in which the shell material provides a substantial degree of structural support, and frame designs, in which an internal framework bears a substantial portion of the load. Whether a monocoque design is more suitable than a frame design in a specific instance may depend on a variety of factors, including the cost of materials and the expected operating conditions. A hybrid approach involving both internal structure and load bearing skin may be employed in situations where optimization favors neither extreme.

Regardless of the design, the wings and fuselage generally comprise separate components that are attached during the manufacturing process. Inasmuch as lift is generated within the wings rather than within the fuselage, this assembly step is usually critical to ensure reliability of the aircraft. Accordingly, this step usually involves permanent attachment of the wings to the fuselage as by fasteners, welding, and adhesives.

While permanent attachment may provide a reliable connection between the wings and fuselage, it may not be optimal in some circumstances. For example, storage of aircraft is generally not volumetrically efficient when the wings remain extended with respect to the fuselage. To overcome these problems, solutions such as folding of the wings, as in the Vought F4U Corsair and Grumman TBF Avenger, have been proposed. However, many of these solutions add complexity and may reduce operational reliability. In addition, many aircraft require low costs, light weight, and low part counts, along with performance demands such as high payload weight capacities, large payload volumes, and good flying characteristics.

SUMMARY OF THE INVENTION

Methods and apparatus for aircraft according to various aspects of the present invention operate in conjunction with a fuselage and a wing. The fuselage may be configured to generate lift in response to airflow over the fuselage. In addition, the fuselage may have at least one hole defined therethrough. A spar may be disposed through the hole and extend into at least a portion of the wing and at least a portion of the fuselage. The spar may connect the fuselage to the wings.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of block components and various processing steps. The block components may be realized by any number of materials and/or components that are configured to perform the specified operations and achieve the various results. For example, the present invention may employ various airfoil designs, e.g., various NACA series designs or their combinations, which may carry out a variety of operations. In addition, the present invention may be practiced in conjunction with in any number of situations, such as a stand-alone take-off and landing vehicle or a marsupial configuration in which a smaller aircraft operates in conjunction with another aircraft. The system described is merely one exemplary application of the invention and the present invention may employ any number of conventional techniques for generating thrust, achieving lift, withstanding operational stresses, and the like.

Figure 1:
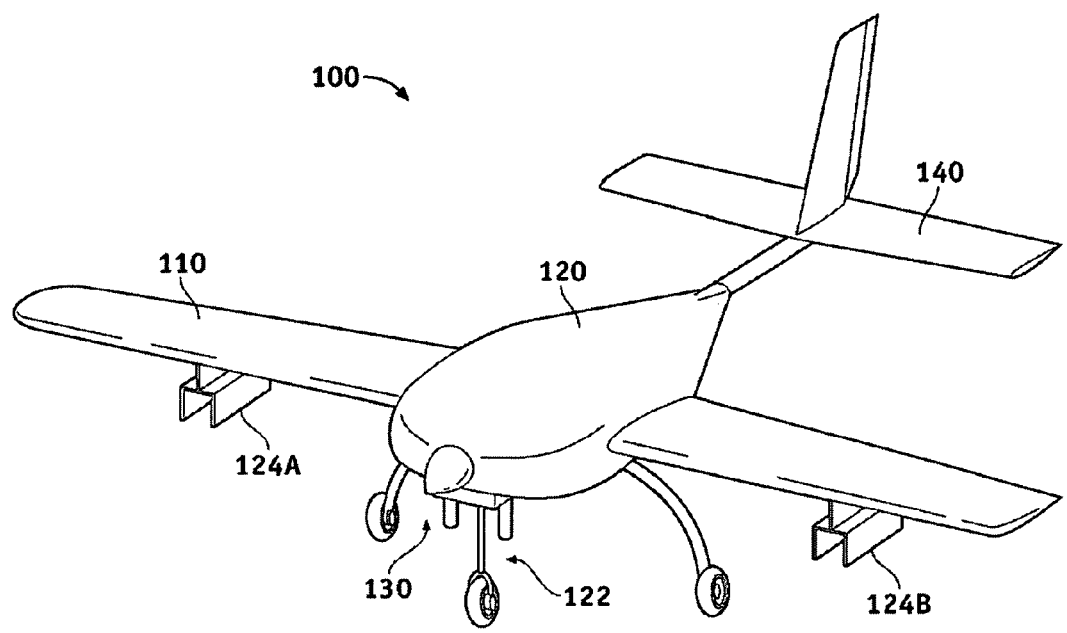
FIG. 1 representatively illustrates an aircraft according to various aspects of the present invention.

Various aspects of the present invention may be applied to any system for aircraft. Certain representative implementations may include, for example a weapons system, a payload delivery vehicle, a piloted aircraft, an unmanned aircraft, a glider, and the like. Referring to FIG. 1, an aircraft 100 according to various aspects of the invention may comprise a self-propelled unmanned aerial vehicle (UAV) including a fuselage 120 coupled to a wing module 110, a propulsion system 122, and a tail assembly 140.

The aircraft 100 may comprise additional components, such as instruments, a radome, weapon and/or sensor mounts, landing gear, and the like. The various components may be integrated into the aircraft, or modularly added on an as-needed basis. For example, the aircraft 100 may be configured to provide force projection by including mounts 124A-B for carrying weapons, sensors, fuel tanks, and the like on the fuselage 120 and/or wing module 110. The aircraft 100 may also comprise systems for relaying communications, obtaining surveillance information, serving as a platform from which weapons systems may be delivered, etc. As another example, one or more mounts may be added to the aircraft 100 for coupling the aircraft 100 to another aircraft in a marsupial configuration for launch during flight.

The fuselage 120 comprises a main structure for aircraft 100. The fuselage 120 may comprise any appropriate structure, such as a hollow structure defining one or more interior compartments, for example for containing payload, aircraft components, and/or other elements. The fuselage 120 may comprise any structure and materials, such as a hollow rigid structure, a resilient structure, or other appropriate structure. In the present embodiment, the fuselage 120 comprises rigid, lightweight materials for maintaining structural integrity and minimizing weight.

Figure 2A:
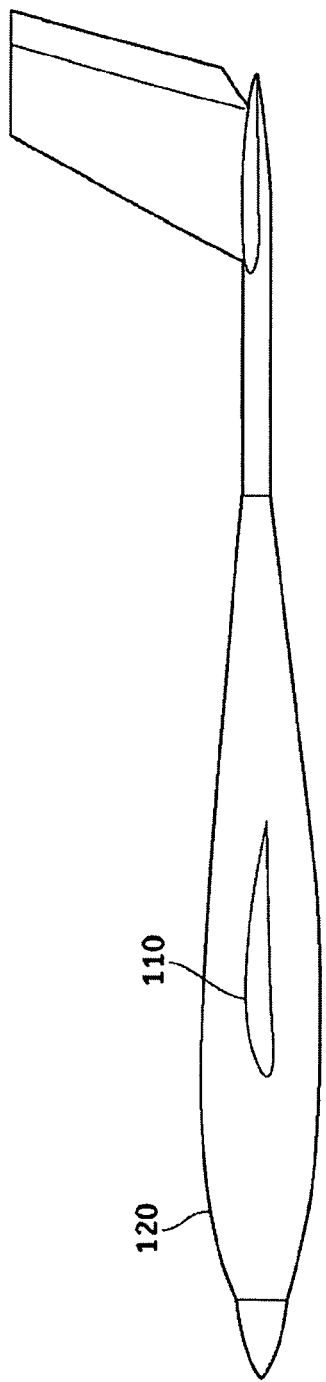
FIGS. 2A-B are side and front views of the aircraft, respectively.
Figure 2B:
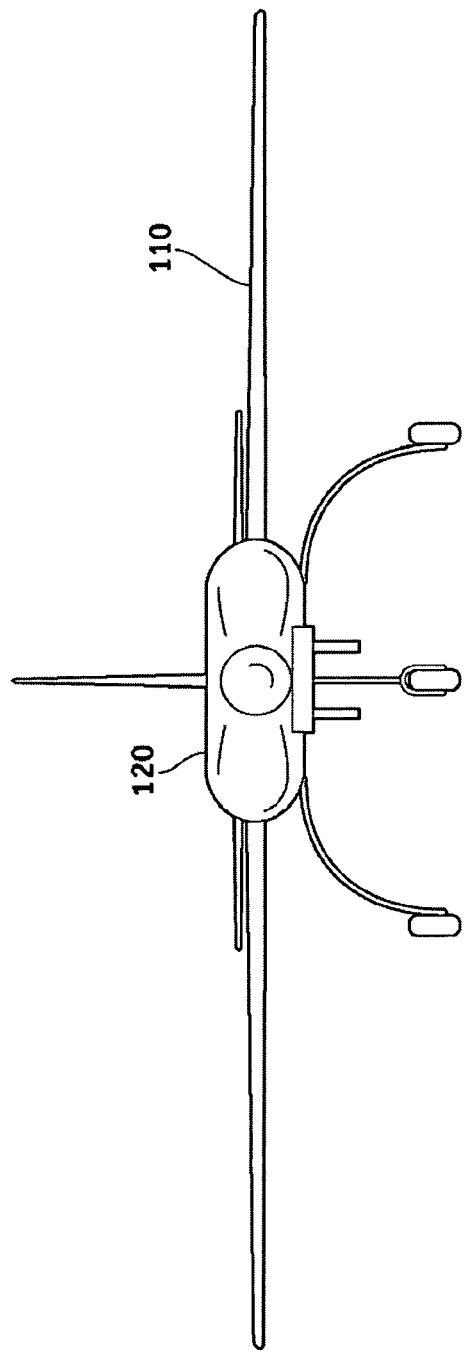
Figure 3:
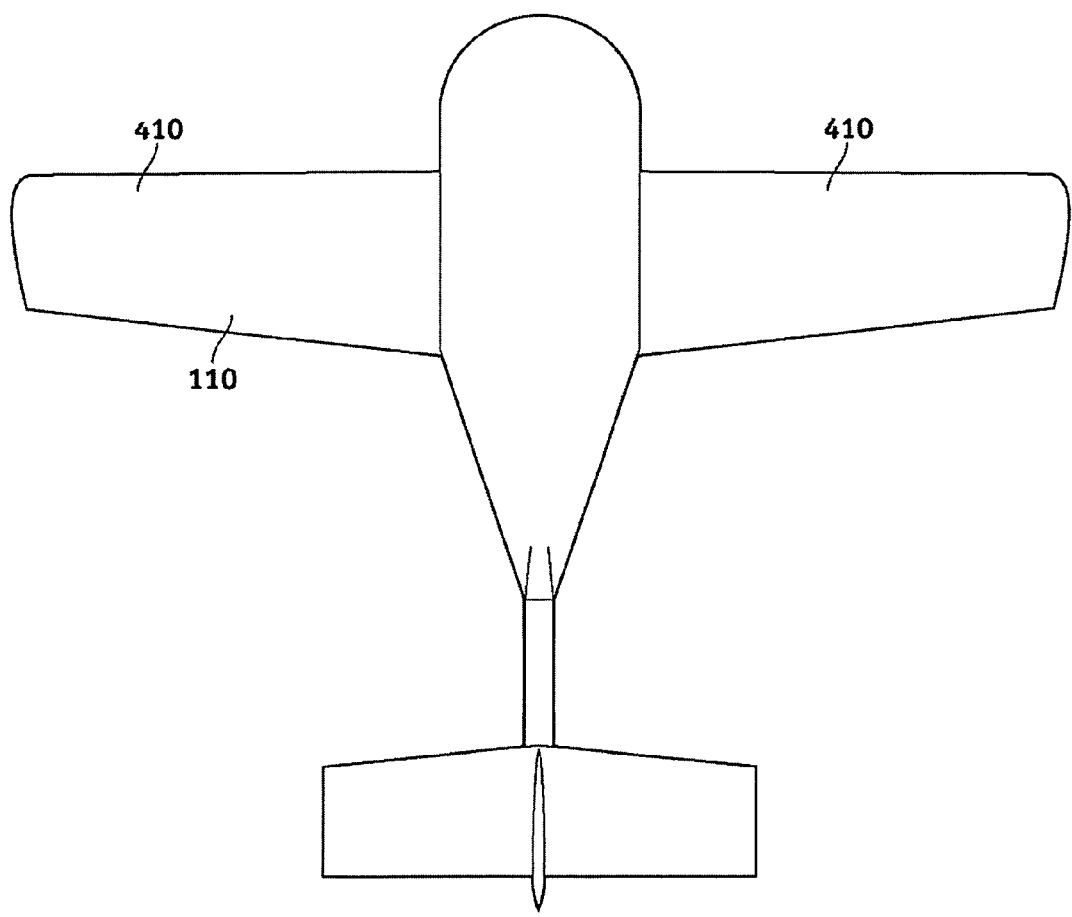
FIG. 3 is a top view of the aircraft.
Figure 4A:
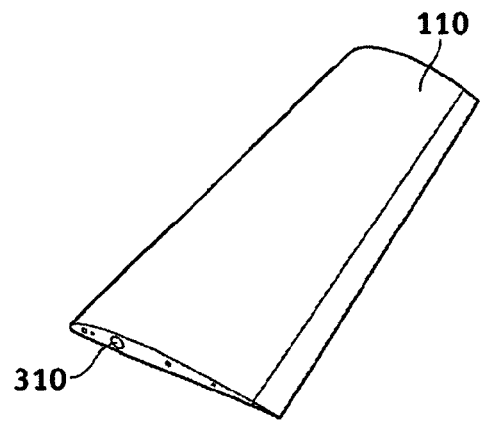
FIGS. 4A-C are perspective, side, and ghost views of a wing.
Figure 4B:
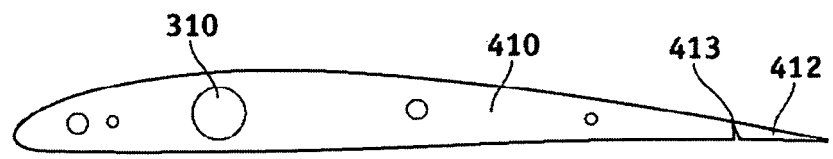
Figure 4C:
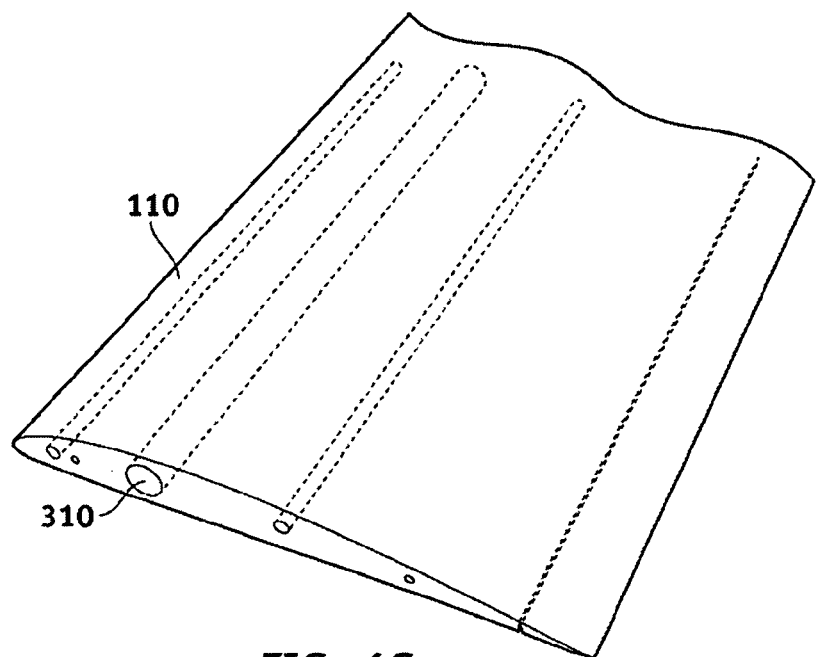

In one embodiment, the fuselage 120 provides lift. For example, referring to FIGS. 1 and 2A-B, the fuselage 120 may provide sufficient lift to fully or partially offset the weight of the fuselage 120 and/or payload contained within the fuselage 120. The shape of the fuselage 120 may be varied according to any appropriate criteria, such as lift, drag, and capacity requirements. The fuselage 120 may further comprise flaps, ailerons, and/or the like with which to selectively adjust the aerodynamic properties of the fuselage 120.

In the present embodiment, the fuselage 120 may comprise an airfoil having an NACA 0013 cross-section such that a resultant lift is generated by the fuselage 120 in response to airflow over the fuselage 120. For example, the fuselage 120 may be configured to provide a ten-inch high profile and exhibit the same drag as a one-inch rod, and provide lift when at an angle of attack. In the present embodiment, the fuselage 120 provides a wide body for large volume and provides lift to accommodate heavy payloads.

The fuselage 120 may include an interior surface defining one or more interior compartments. The fuselage 120 may include any appropriate interior compartments, for example to contain instrumentation, sensors, weapons, fuel tanks or fuel cells, or other appropriate payload. In the present embodiment, the fuselage 120 interior compartment contains a motor for the propulsion system 122, navigation and control systems for guiding the aircraft 100, communication systems for communication with external systems, and a fuel tank and/or battery. The fuselage 120 may contain, however, any suitable components or materials, and may be accessible, such as via a hatch.

In the present embodiment, the fuselage 120 contains a generator. The generator may be powered by a motor associated with the propulsion system 122. The motor may provided more power than required to propel the aircraft 100, particularly following initial takeoff and climbing phases. The generator may provide power for onboard systems, such as navigation, guidance, and communications systems. Consequently, batteries for such systems may be omitted or reduced, contributing to a lighter aircraft 100.

The fuselage 120 may include a surface geometry configured to facilitate attachment of the fuselage 120 to other structures. For example, the fuselage 120 may include one or more connectors or other structures for engaging other aircraft 100 components and/or external systems. The present fuselage 120 includes connectors for engaging the wing module 110, the tail assembly 140, and a propeller 130. The various connectors may be configured to detachably connect one or more of the wing module 110, tail assembly 140, and propeller 130 to facilitate disassembly of the aircraft 100, for example for storage and/or transport to a deployment area. In addition, the fuselage 120 may include additional connectors, such as mounts for receiving external or internal equipment, such as sensors, weapons, and fuel tanks.

The wing module 110 provides lift and/or control for the aircraft 100. The wing module 110 may be configured to provide any desired aerodynamic properties for the surface of the aircraft 100. For example, the wing module 110 may be configured to generate lift, for example in response to airflow over the wing module 110. The wing module 110 may comprise any system for counteracting the effects of gravity, including a fixed airfoil structure, a selectively adjustable airfoil structure, etc.

For example, the wing module 110 may be configured to provide sufficient lift to offset the weight of the wing module 110 as well as structures coupled to the wing module 110. Resultant lift may be achieved in any appropriate manner including through selective adjustment of the various properties of the wing module 110 like its aerodynamic cross section, its dimensions, its surface characteristics, its mass, etc. In the present embodiment, the wing module 110 comprises multiple substantially fixed wings, and may feature flaps, ailerons, slats, and/or other control surfaces and components configured to selectively adjust the aerodynamic properties of the wing module 110.

The wing module 110 may be configured in conformance with any specified geometry, dimension, and material. The wing module may comprise strong, lightweight materials with a smooth exterior surface. In one embodiment, referring to FIGS. 3 and 4A-C, the wing module 110 comprises a pair of foam core, fiberglass skin airfoils having an SD7032 cross section. In this embodiment, each wing 410 comprises a length of about 49 inches, a minimum width of 15 inches, a maximum width of 20.5 inches, and a flap 412 having a width of 2.5 inches. The flap 412 may be coupled to the wing 410 along the trailing edge, for example via a top skin hinge 413. In addition., the wing module 110 may be configured to provide a specified washout angle, such as a washout angle of 1.5 degrees.

In another embodiment, the wing module 110 further includes wingtips configured to extend the effective wingspan of the wing module 110. As air flows over an airfoil, the wingtip may experience vortices that influence the performance characteristics of the airfoil. For example, rounded and square wingtips may actually reduce the effective wingspan in that these geometries produce wingtip vortices that act to produce drag. By contrast, wingtips like Horner tips direct vortices out along the length of the wing 410, pulling up and increasing the effective length of the wingspan. In the present embodiment, referring to FIGS. 5A-C, the wing module 110 includes Horner tips 510 comprising a magnitude of about 35 degrees measured from the bottom plane of the wing module 110.

The wing module 110 may be configured to be integrated into, permanently attached to, or detachably attached to the fuselage 120. In the present embodiment, the wing module 110 includes a surface geometry to attach to the fuselage 120. The wing module 110 may be configured in any appropriate manner to connect to the fuselage 120, for example with fasteners such as bolts. In addition, the wing module 110 may be connected via structural support that may connect the wing module 110 to the fuselage and/or provide support for the wing module 110.

The structural support may comprise any suitable component for supporting the wing module 110 with respect to the fuselage 120. For example, referring to FIGS. 5A-C, the structural member may comprise a spar 250 to attach various structures of the aircraft 100 together and/or improve the structural integrity of the aircraft 100. The spar 250 may bear at least a portion of the operational load imparted to the wing module 110 and/or the fuselage 120 during flight. The spar 250 may comprise any system for connecting elements and/or mitigating the effects of operational stress such as a high strength rod, a plurality of girding structures, etc. In this embodiment, the spar 250 may comprise a lightweight, high strength, rigid material, such as carbon fiber, metal, and the like, while other elements of the aircraft 100, such as the wing module 110 and the fuselage 120, may comprise comparatively weaker material, such as foamed polymer or cellulose. Thus, the spar 250 may support the vertical load on the wing module 110 and allow the wing module 110 to be no stronger than required to be an aerodynamic shape holder. In the present embodiment, the spar 250 comprises a hollow carbon fiber cylinder configured to removably attach to the wing module 110 and the fuselage 120.

Figure 5A:
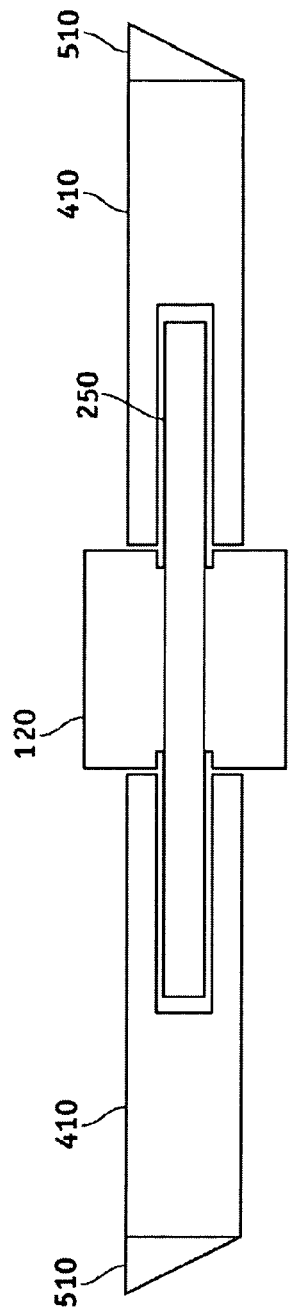
FIGS. 5A-C representatively illustrate a spar disposed through a fuselage and a wing module.
Figure 5B:
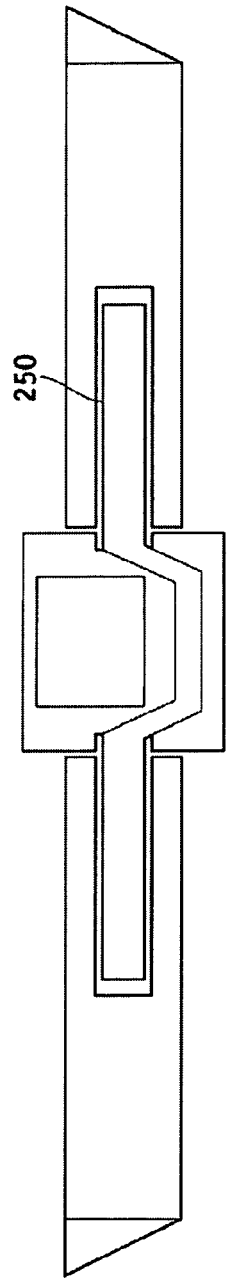
Figure 5C:
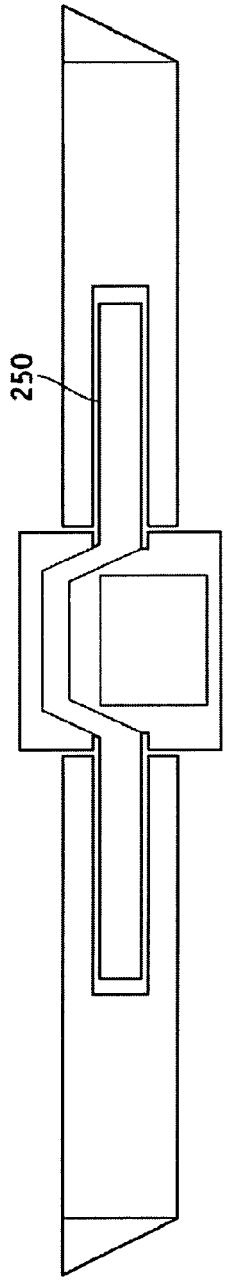
Figure 6A:
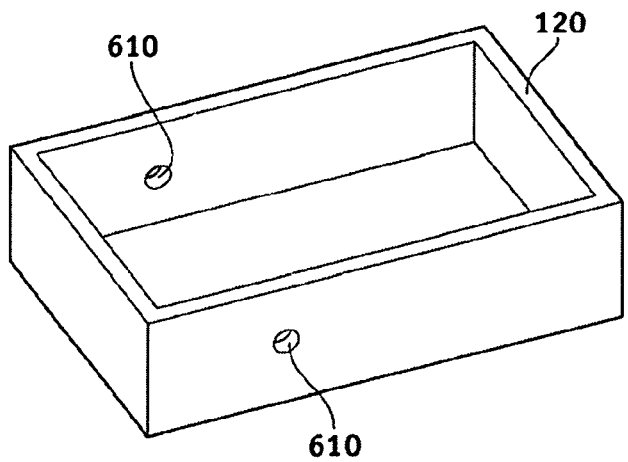
FIGS. 6A-B illustrate a simplified fuselage and a spar disposed through holes in the fuselage.
Figure 6B:
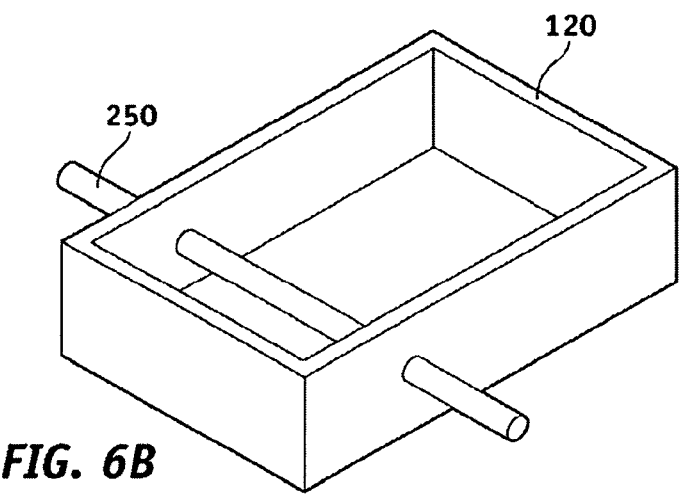
Figure 7A:
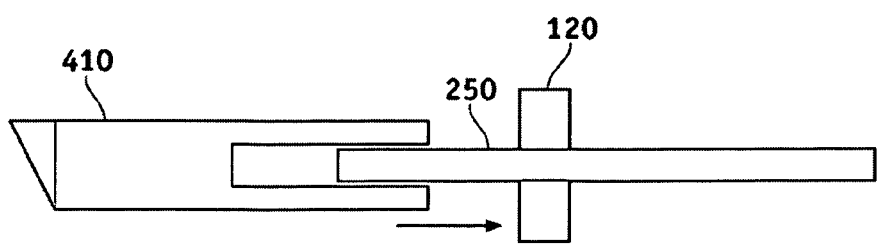
FIGS. 7A-B illustrate connection of a wing to the spar and abutting the fuselage.
Figure 7B:
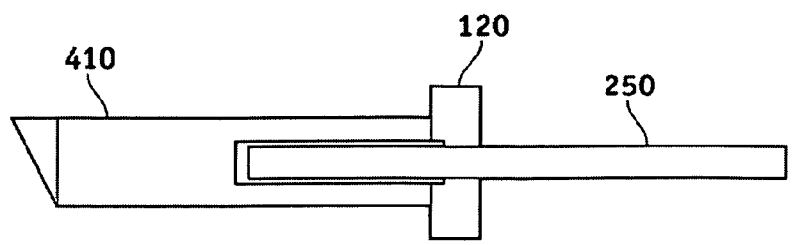

The spar 250 may connect to the wing module 110 and the fuselage 120 in any appropriate manner. For example, the wing module 110 may comprise a pair of wings 410 that attach to the spar 250 on opposite sides of the fuselage 120. Referring again to FIGS. 4A-C, 5A-C, and 7A-B, at the point of attachment, the wings 410 may include cylindrical apertures 310 configured to mate with the spar 250. Referring to FIGS. 6A-B, the fuselage 120 (shown in a simplified configuration) may likewise include cylindrical holes 610 defined through the fuselage 120 to receive the spar 250. The spar 250 may be slidably received through the holes 610 in the fuselage 120 such that the spar 250 is a "floating spar" that may slide axially through the holes 610. By substantially aligning the cylindrical apertures 310 of the wing module 110 with the cylindrical holes 610 of the fuselage 120, the spar 250 may couple the wing module 110 to the fuselage 120. The spar 250 may be configured for insertion through the holes in the fuselage 120, for example including two or more sections joined by a hinge or connector. The holes 610 may be positioned to align the principal axis of the spar with the aerodynamic center of the aircraft.

The spar 250 may be connected to the wing module 110 in any appropriate manner, such as by frictional cohesion between the surface of the spar 250 and the internal surface of the aperture 310 in the wings 410. Alternatively, the wings 410 may be attached to the spar 250 in any suitable manner, such as via threaded surfaces, fasteners, welding, adhesives, or the like. For example, the aircraft 100 may be configured for rapid assembly and/or rapid disassembly in embodiments featuring frictional cohesion between the spar 250 and the wing module 110 and/or the fuselage 120. Such a configuration may be desirable in situations where rapid deployability is advantageous, as in military applications. Specifically, in embodiments in which frictional cohesion is sufficient to accommodate the operational stresses, the aircraft 100 may be rapidly assembled without the need for machine tools or other complex hardware.

In the present embodiment, the spar 250 includes an exterior surface having frictional properties conducive to frictional cohesion between the spar 250 and other components. In one embodiment, the frictional cohesion between the spar 250 and the apertures 310 formed in the wing module 110 substantially attaches the wing module 110 to the fuselage 120. Alternatively, the wings 410 may be attached in position, such as by fastening the each wing 410 to the fuselage 120 and/or the spar 250. For example, the proximal edge of each wing 410 may be bolted or otherwise attached to the fuselage 120 and/or the distal end of the wing 410 may be bolted or otherwise attached to the spar 250, for example prevent the wing 410 from sliding off the spar 250.

The spar 250 may rotate with respect to the wing module 110 and/or the fuselage 120. In various embodiments, fasteners may be fastened to the fuselage 120 and/or the wing module 110 to inhibit rotation of the wing module 110 with respect to the fuselage 120 about the spar 250. Alternatively, the spar 250 and wing aperture 310 may be shaped with a non-round cross section to inhibit rotation of the wing 410 around the spar 250.

In addition, the fuselage 120 may be configured to couple to the spar 250 and to the wing module 10 such that the spar 250 substantially passes through the aerodynamic center of the aircraft 100. Further, the fuselage 120 may be configured to couple to the spar 250 and the wing module 110 such that the lift generated by the fuselage 120 and the lift generated by the wing module 110 are coplanar.

The spar 250 may conform to the internal compartment of the fuselage 120 or to the contents of the internal compartment. For instance, the spar 250 may conform to the interior surface of the fuselage 120 such that the spar 250 may be disposed flush against the interior surface 325 of the fuselage and/or such that the spar 250 may be disposed within the internal compartment and accommodate a specified payload. Referring to FIGS. 5A-C, multiple spar 250 shapes may be employed to accommodate different payload configurations, and the particular interchangeable spar 250 may be selected for the particular payload.

The propulsion system 122 provides propulsion to the aircraft 100. The propulsion system 122 may comprise any suitable system for propelling the aircraft 100, such as an airscrew, jet engine, or mass ejection drive system like a rocket. In the present embodiment, the propulsion system 122 comprises a propeller 130 driven by a motor, such as an electric or combustion motor. Various embodiments may be configured without a propulsion system 122, such as a glider or guided projectile.

The tail assembly 140 may comprise a conventional tail configuration, such as to provide specific aerodynamic properties like yaw and/or pitch control. The tail assembly 140 may comprise any system for controlling orientation including an adjustable control surface, a fixed tailfin, etc. In the present embodiment, the tail assembly 140 comprises a first set of tail fins substantially parallel to the wing module 110, a second set of tail fins substantially normal to the first set, and a tail boom coupling the tail fins to the fuselage 120. The tail assembly 140 may be configured for selective detachment from the fuselage 120. Further, each set of tail fins may comprise an adjustable surface, such as a rudder or elevator, such that yaw, roll, and/or pitch may be modified through actuation of the surfaces.

In operation, the aircraft 100 may be assembled and prepared for flight. The aircraft 100 may be launched and travel to a target area to deploy sensors or weapons, deliver a payload, or otherwise perform desired tasks. The aircraft 100 may return and land for redeployment or disassembly.

More particularly, the spar 250 may be connected to the fuselage 120, for example by sliding the spar 250 through the holes in the fuselage. The wing module 110 may be attached as well, for example by inserting the ends of the spar 250 into the apertures formed in the wings. The wing module 110 may further be secured, for example by attaching fasteners to inhibit rotation of the wings about the spar 250 relative to the fuselage 120. The propulsion system 122 may likewise be assembled or otherwise prepared, such as by attaching the propeller 130 and adding fuel to the fuel tank. The tail assembly 140 may be attached to the fuselage 120. Any electronic connections may also be made, such as connecting the wing flaps and tail assembly's 140 rudder and elevators to an onboard control system.

Any other preparation may also be performed. For example, a payload may be added to the aircraft 100, for example in the interior compartment of the fuselage 120 or on external mounts. Electronic systems may also be initiated and programmed, such as navigational and communications equipment.

The propulsion system 122 may be activated and the aircraft may take off. In flight, the propulsion system 122 propels the aircraft 100 and the wing module 110 provides lift. The fuselage 120 may hang from the spar 250, and may provide additional lift to supplement the lift provided by the wing module 110. The control surfaces on the wing module 110 and tail assembly 140 facilitate control of the aircraft. In addition, the generator may supply power to various aircraft systems.

The aircraft 100 may fly to a destination, such as a target area. The aircraft 100 may perform desired tasks, such as deploying sensors or weapons and/or delivering a payload. The aircraft may return from the mission for redeployment or disassembly. The aircraft 100 may be more volumetrically efficient when disassembled than when operationally assembled. Inasmuch as the aircraft 110 may be more rapidly transported when disassembled and stored efficiently than when operationally assembled, rapid assembly coupled with rapid transport may enhance the force projection capabilities of the aircraft 100.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A modular lifting body aircraft, comprising:
a wing module;
a fuselage configured to:
  detachably couple to the wing module, wherein the fuselage includes at least one hole defining a path from an interior section of the fuselage to an exterior surface of the fuselage; and
  impart a lifting force in response to airflow over the fuselage; and
a spar configured to extend from the interior section of the fuselage through the at least one hole and into at least a portion of the wing module, wherein the spar is not rigidly connected to the wing module or the fuselage, wherein the spar includes a non-linear spar section disposed within the fuselage that bends in the vertical plane to accommodate a payload.

* * * * *